June 9, 1931.　　　R. R. VAN HORN　　　1,809,765
THEFTPROOF STEERING WHEEL
Filed May 1, 1929　　2 Sheets-Sheet 1
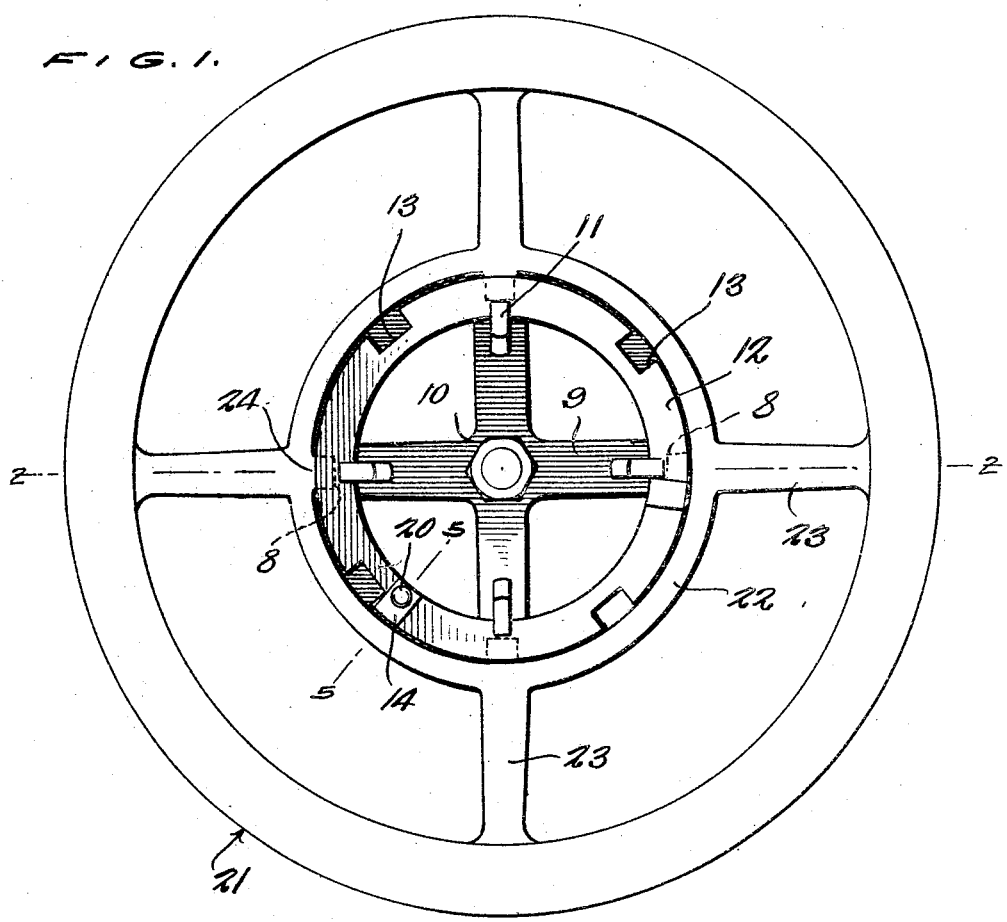
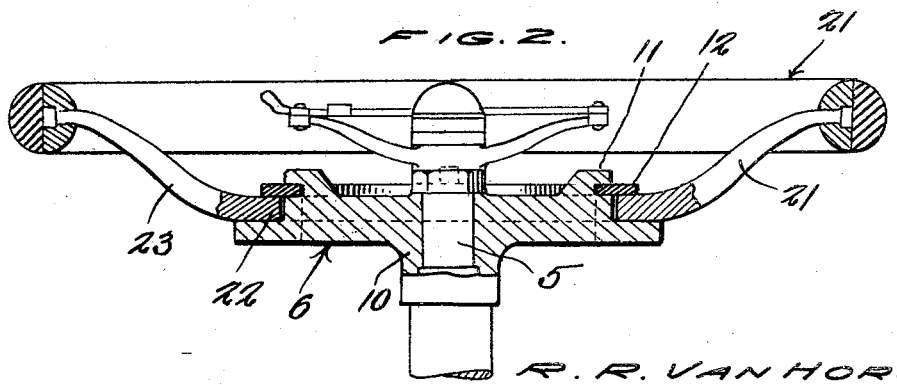
R. R. VAN HORN
Inventor

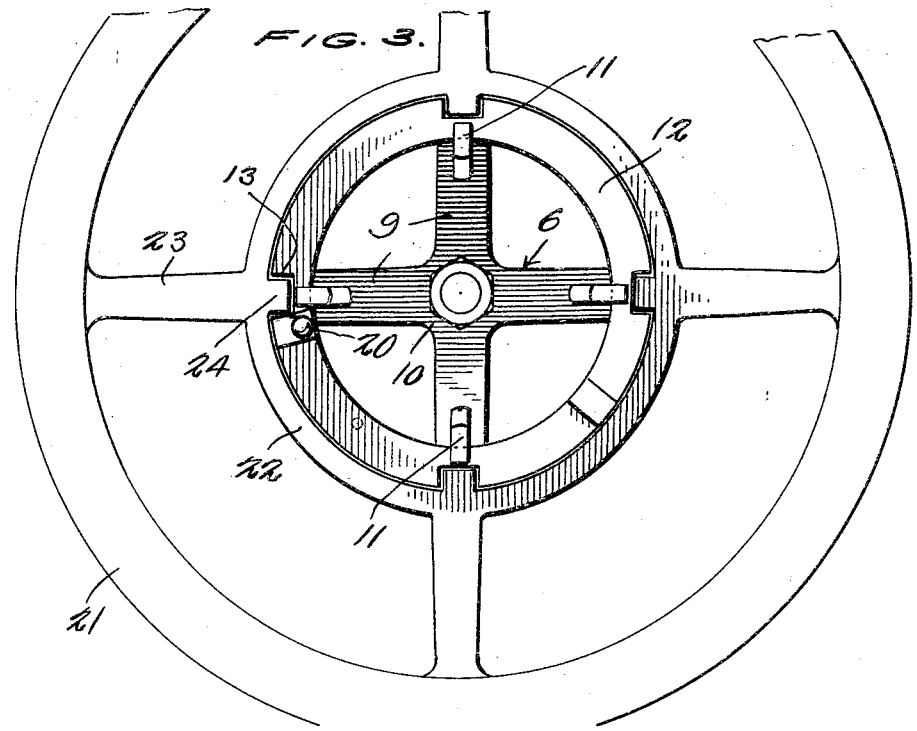
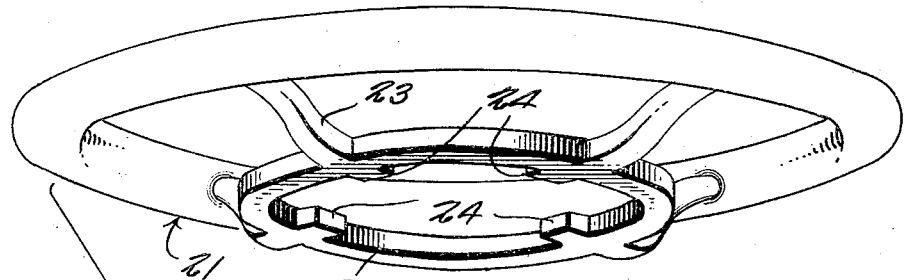
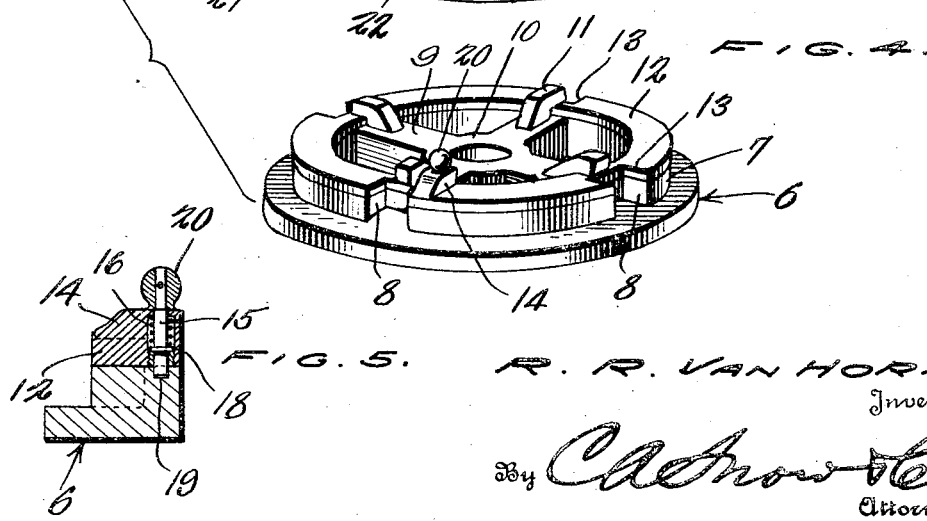

Patented June 9, 1931

1,809,765

UNITED STATES PATENT OFFICE

ROBERT R. VAN HORN, OF COLUMBUS, OHIO

THEFTPROOF STEERING WHEEL

Application filed May 1, 1929. Serial No. 359,659.

This invention relates to motor vehicle steering wheels, the primary object of the invention being to provide a steering wheel embodying separable sections, one section being stationary and secured to the steering column of the vehicle, the other section being removably secured to the stationary section so that it may be readily and easily removed when the motor vehicle is being parked, thereby preventing the operation of the motor vehicle by unauthorized persons.

A further object of the invention is to provide a device of this character which may be operated without the use of keys or other similar locking device.

A still further object of the invention is to provide a steering wheel of the theft proof type which may be readily and easily positioned on the usual steering post without the necessity of making extensive alterations in the steering mechanism.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a steering wheel constructed in accordance with the invention.

Figure 2 is a sectional view taken on line 2—2 of Figure 1.

Figure 3 is a plan view showing the locking ring moved to a position to release the wheel.

Figure 4 is a perspective view illustrating the wheel and stationary section of the wheel disconnected.

Figure 5 is a sectional view taken on line 5—5 of Figure 1.

Referring to the drawings in detail, the reference character 5 designates the upper end of a steering post of a motor vehicle to which the stationary disk like section 6 of the steering wheel, forming the subject matter of this invention, is secured.

This stationary section 6 has a portion of its periphery defining an upstanding central section 7 provided with notches 8 arranged at predetermined points in the periphery of the upstanding section 7. Spokes 9 provide a part of the stationary section 6, which spokes radiate from the hub 10. Extending upwardly and laterally from the spokes are fingers 11 which have their under surfaces cut away providing a space for the reception of the locking ring 12 which slides thereunder, the locking ring 12 being provided with notches 13 designed to register with the notches 8 formed in the upstanding portion 7, for purposes to be hereinafter more fully described.

An enlargement 14 is formed on the upper surface of the locking ring 12 and provides a stop to engage one of the fingers 11 and prevent further rotation of the locking ring, it being understood that when the enlargement 14 moves to engage the finger adjacent thereto, the notches of the upstanding section and the locking ring will align. The enlargement 14 is provided with an opening in which the pin 15 operates, there being provided a coiled spring 16 surrounding the pin and positioned within the opening, for normally urging the pin to its active position. One end of the coiled spring rests against the shoulder 17 formed at the upper end of the opening, the opposite end of the spring resting against the flange 18 formed on the pin to normally urge the pin downwardly. The pin is adapted to pass into the opening 19 of the upstanding section 7 to lock the ring 12 against movement with respect to the upstanding section 7. In order that the pin may be readily operated, a finger piece 20 is provided at the uper end thereof.

The reference character 21 designates the removable section of the steering wheel which embodies a central ring section 22 and spokes 23, the ring section 22 being provided with inwardly extended lugs 24 of sizes to fit within the notches of the upstanding section 7 and locking ring 12. These lugs 24 are of thicknesses equal to the height of the upstanding section 7 so that when the lugs are positioned in the notches the upper surfaces thereof will lie flush with the upper surface of the upstanding section permitting the locking ring to move readily over the lugs in such a way as to securely lock the removable section in position.

When it is desired to park a car supplied with a wheel of this type, the pin 15 is removed from the opening of the upstanding section 7 and the locking ring 12 is moved to a position as shown by Figure 3, whereupon the wheel proper may be removed and carried with the person operating the car leaving the car with no steering means, thereby preventing the operation of the car by unauthorized persons.

I claim:

A steering wheel for motor vehicles, comprising a stationary disk-like member to be secured to the steering post of a motor vehicle, an upstanding circular central section of a diameter less than the diameter of the stationary member, providing a flange, said upstanding central section having notches, a locking ring having notches adapted to register with the notches of the central section, said locking ring being slidably mounted on the upstanding section, means for holding the locking ring against displacement on the upstanding section, a steering wheel, a central ring section forming a part of the steering wheel, lugs extending inwardly from the ring section of the steering wheel and adapted to fit within the registering notches of the upstanding section of the stationary member and locking ring, said locking ring adapted to move to overlie the lugs, and means for holding the locking ring against rotary movement.

In testimony that I claim the foregoing as my own, I have hereto affixed my signature.

ROBERT R. VAN HORN.